D. L. CASTON.
PIPE COUPLING.
APPLICATION FILED NOV. 6, 1914.
1,214,425.
Patented Jan. 30, 1917.
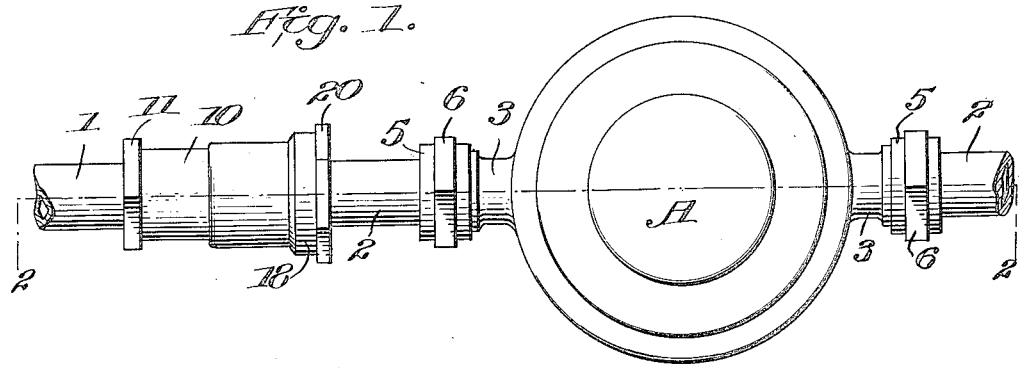
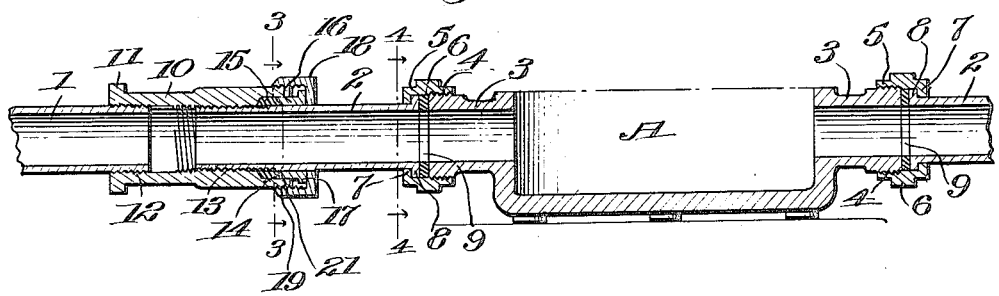
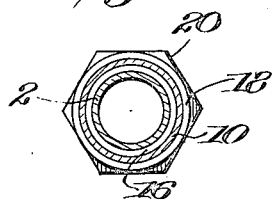
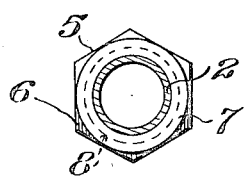
Inventor,
David L. Caston,
Witnesses
M. A. Jones
A. M. Gibbs
By Frank Fuller
Attorney

UNITED STATES PATENT OFFICE.

DAVID L. CASTON, OF COMMERCE, GEORGIA.

PIPE-COUPLING.

1,214,425.  Specification of Letters Patent.  Patented Jan. 30, 1917.

Application filed November 6, 1914. Serial No. 870,558.

*To all whom it may concern:*

Be it known that I, DAVID L. CASTON, a citizen of the United States, residing at Commerce, in the county of Jackson and State of Georgia, have invented certain new and useful Improvements in Pipe-Couplings, of which the following is a specification.

My invention relates to improvements in means for connecting water meters to supply pipes.

As water meters are connected to their supply pipes at the present time, considerable difficulty is experienced in removing the meter when it is necessary to inspect, repair or replace it.

It is the prime object of my invention to provide a novel construction, combination and arrangement of parts forming a coupling whereby a water meter may be connected to the sections of the supply pipe and be capable of ready detachment therefrom.

The preferred embodiment of my invention is hereinafter described and illustrated in accompanying drawings, wherein:

Figure 1 shows a water meter in plan view having my improvement applied to the supply pipe thereof; Fig. 2 is a longitudinal sectional view on the line 2—2 of Fig. 1, but showing the meter fragmentarily; Fig. 3 is a cross sectional view on the line 3—3 of Fig. 2, and Fig. 4 is a cross sectional view on the line 4—4 of Fig. 2.

Referring specifically to the drawings, wherein like reference characters designate like or similar parts, A designates a water meter conventionally. The specific structure of the meter is not shown or described, as the construction thereof is immaterial since my improvements are capable of use in connection with practically all types of meters. As a matter of fact, the invention is capable of use in connection with any device that is connected between two sections of pipe. Of the supply pipe to which the meter A is coupled, 1 represents one section thereof and 2 designates movable short pipe sections which are adapted to be connected directly to the meter. The meter is provided with conduits in the nature of spuds 3 integral with the casing of the meter and provided with exterior screw threads at 4. On the screw threads 4 ride nuts 5 which have interior screw threads, wrench engaging heads 6, central bores, and inwardly extending flanges 7 at the bore. The pipe sections 2 have at their inner ends annular outwardly extending flanges 8 which overlap and abut with the flanges 7 interiorly of the nuts 5. Upon tightening of the nuts 5, the flanges 7 abut against the flanges 8 to effectively fasten the pipe sections 2 to the meter spuds 3. Preferably washers or gaskets 9 are interposed between the inner ends of the pipe sections 2 and the outer ends of the spuds 3.

In order to permit ready attachment and detachment of the meter, it is essential that one of the pipe sections 2 have a movement away from the meter. To this end, a sleeve 10 is employed which is provided with a wrench-engaging head 11 to facilitate its attachment to the pipe section 1. This sleeve 10 and the pipe section 1 have interengaging screw threads at 12. The left-hand pipe section 2 shown in the drawings, is provided with screw threads which loosely engage screw threads on the interior of the sleeve 10 at 13. The bore of the sleeve 10 is enlarged to provide a packing chamber 14 having packing therein designated 15, and into which chamber slides a gland 16 to bear directly against the packing. This gland 16 is provided with an annular flange 17 adapted to remain in spaced relation to the adjacent end of the sleeve 10 so that a tool may be interposed between the flange 17 and sleeve 10 to move the gland away from the packing 15. A nut 18 has screw threads at 19 to engage corresponding screw threads on the exterior of the sleeve 10, and it also has an inwardly extending flange 20 provided with a bore through which the adjacent pipe 2 extends and which flange 20 bears against the gland 16 to force it into proper engagement with the packing 15.

In order to more effectively compress the packing 15, the inner end of the gland 16 is preferably beveled at 21. As it is essential that but a single pipe section 2 be employed to move away from the meter A, the right hand pipe 2 may be the supply pipe proper or it may be a slidable pipe section similar to the left-hand pipe section 2.

Should it be desired to detach the meter A while the parts are fastened in the relation illustrated, nut 18, upon the application of a suitable wrench or tool thereto is loosened so that the gland 16 can move out of compressing relation with the packing 15. If necessary, this nut 16 can be completely unscrewed from the sleeve to slide the gland away from the packing. Thereupon the nut 5 adjacent the nut 18 is unscrewed from the adjacent spud 3, and the short pipe section 2 is rotated to the right by a pipe wrench or other tool, engaging deeper in the threads of sleeve 10, thus giving the pipe section 2 a receding motion from meter spud 3, and giving a clearance between pipe section 2 and spud 3. Inasmuch as the pipe section 2 is to be engaged by a wrench, it is sufficiently elongated for this purpose.

In replacing the meter, the washers 9 are interposed between the pipes 2 and the spuds 3. The short pipe section 2 is then rotated to the left, by a pipe wrench or other tool, making the penetration of short pipe section 2 less in sleeve 10 and at the same time moving the loosened pipe section 2 as far as possible toward the adjacent spud 3 and the nuts 5 are then screwed to spuds 3. After this operation the nut 18 is tightened so as to move the gland 16 into close relation with the packing 15 in order to compress it to form a water tight joint between the sleeve and the adjacent pipe section 2.

Inasmuch as merely the preferred embodiment of the invention has been illustrated and described, it is to be understood that changes in the details of construction may be resorted to without departing from the spirit and scope of the invention.

I claim:

In a meter coupling, a meter box having a threaded spud, a pipe section, an internally threaded sleeve secured thereto, a flanged union member threaded into the sleeve having a connecting nut loosely mounted thereon and arranged to engage the flange and thread onto the spud, said spud and union member arranged to butt joint, a compressible washer between the ends of the spud and union member, and a packing carried by the sleeve and surrounding the union member.

In testimony whereof I affix my signature in presence of two witnesses.

DAVID L. CASTON.

Witnesses:
R. L. DAUGHTRY,
W. S. MIZE.